United States Patent [19]
Curtis

[11] Patent Number: 5,176,778
[45] Date of Patent: Jan. 5, 1993

[54] METHOD FOR MAKING FIBERGLASS ARTICLES

[76] Inventor: Harold Curtis, Rte. 2, Box 139, Chickasha, Okla. 73018

[21] Appl. No.: 675,424

[22] Filed: Mar. 26, 1991

[51] Int. Cl.⁵ .............................................. B29C 65/54
[52] U.S. Cl. .................................... 156/286; 156/198; 156/292; 264/545; 264/512
[58] Field of Search ............... 156/196, 198, 285, 286, 156/292; 264/545, 510, 571, 512

[56] References Cited

U.S. PATENT DOCUMENTS

| | | | |
|---|---|---|---|
| 2,983,305 | 5/1961 | Scher et al. | 156/286 |
| 3,193,440 | 7/1965 | Schafer | 161/159 |
| 3,210,230 | 10/1965 | Tyhurst | 156/228 |
| 3,329,546 | 7/1967 | Scheinert | 156/228 |
| 3,334,001 | 8/1967 | Tyhurst | 156/228 |
| 3,775,214 | 11/1973 | Winters | 156/286 |
| 3,817,806 | 6/1974 | Anderson et al. | 156/161 |
| 4,030,953 | 6/1977 | Rutschow et al. | 156/79 |
| 4,131,664 | 12/1978 | Flowers et al. | 264/510 |
| 4,201,823 | 5/1980 | Russell | 428/246 |
| 4,298,556 | 11/1981 | Rutsch et al. | 264/46.6 |
| 4,385,955 | 5/1983 | Doerfling et al. | 156/245 |
| 4,664,862 | 5/1987 | Ghavamikia | 264/257 |
| 4,737,390 | 4/1988 | Fricano et al. | 428/35 |
| 4,882,114 | 11/1989 | Radvan et al. | 264/129 |
| 4,891,176 | 1/1990 | Drysdale et al. | 264/250 |

Primary Examiner—Michael W. Ball
Assistant Examiner—Francis J. Lorin
Attorney, Agent, or Firm—Laney, Dougherty, Hessin & Beavers

[57] ABSTRACT

A method for making fiberglass articles includes steps for forming fiberglass sections each having a smooth and an unfinished surface and a raised portion, placing unfinished surfaces wet with bonding agent in contact, thus defining a hollow interior channel adjacent to the raised portion, and evacuating the hollow interior channel to compressively hold the sections together while the fiberglass cures to form a single, integral fiberglass part having a smooth finish on all surfaces.

24 Claims, 4 Drawing Sheets

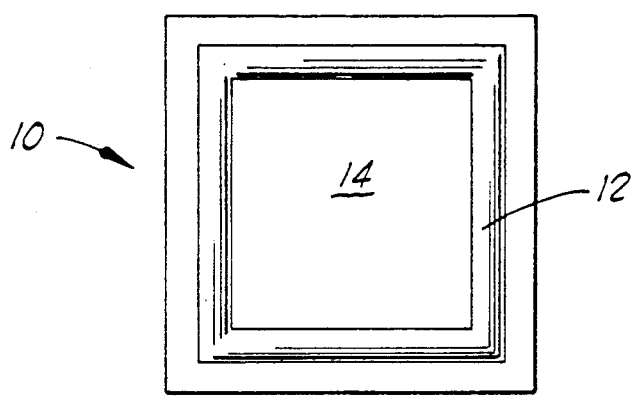
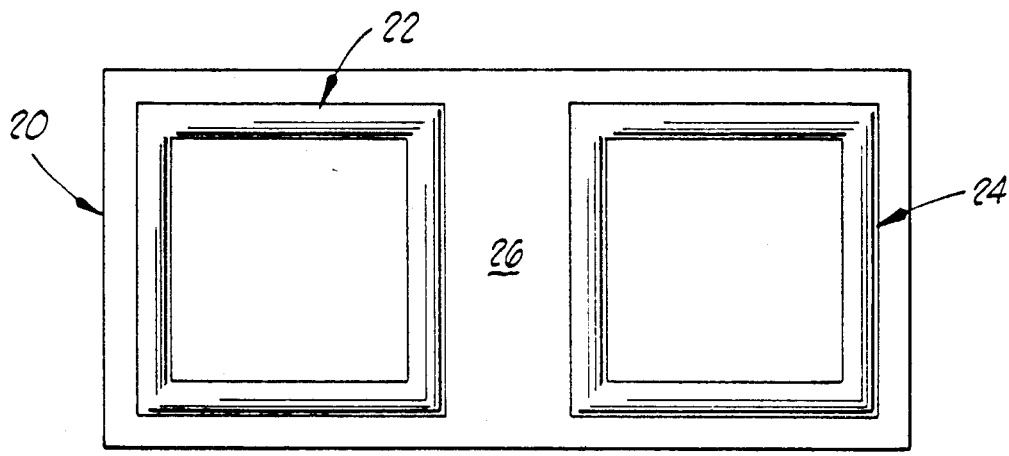
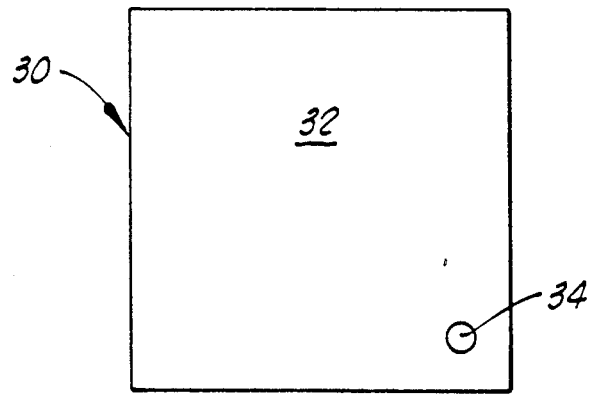

METHOD FOR MAKING FIBERGLASS ARTICLES

BACKGROUND OF INVENTION

1. Field of the Invention

This invention relates to fabrication of fiberglass articles.

2. Description of the Prior Art

It is desirable to fabricate fiberglass articles having smooth surfaces on all sides. Tyhurst, U.S. Pat. Nos. 3,210,230 and 3,334,001, describes layup molding techniques for fabricating laminated plastic parts having such smooth exterior surfaces.

According to this method, at least two sections are fabricated by first applying a smooth or gel coat to a mold. A fiber reinforced thermosetting plastic coating is then applied to the gel coat. After the fiber reinforced coating has polymerized, a bonding coating such as a resin is applied to one of the sections and the two sections are then brought together such that their rough surfaces, at least one of which is coated with a bonding agent, are in contact. The sections are then subjected to slight pressure while the bonding coating is allowed to cure. According to both of the Tyhurst methods, this slight compressive force is exerted by pushing down on the joint sections with the mold used to form one of the sections. After the bonding coating has cured, the molded article can be removed from the molds.

SUMMARY OF THE INVENTION

The invention provides a method for forming a fiberglass part. According to this method, at least two fiberglass sections, each having a smooth surface and an unfinished surface are formed. At least one of the sections has a raised portion or rib. The unfinished surface of at least one section is wet with a bonding agent, such as a resin. Then, the unfinished surfaces, including at least one which is wet with bonding agent are placed in contact so that a hollow interior channel is defined between the sections adjacent to the raised portion. A vacuum source is connected to evacuate the hollow interior channel, causing atmospheric pressure to compressively hold the sections firmly together. Finally, the fiberglass is allowed to cure, forming a single, integral fiberglass part having a smooth finish on all surfaces.

The smooth surface can be produced by spraying a gel coat into the interior of forms before laying up fiberglass and resin layers. At least one of the sections can be designed so that the raised portion imparts rigidity to the section. Such a rigid, ribbed section is relatively more rigid than a flat section of equal thickness. Furthermore, the raised portion can extend substantially along the periphery of the rigid section so that a border exists between the section edge and the raised portion which can be shaped into a flange to hold parts together or be used for fastening sections together.

FIG. 11 shows a raised portion 110 which runs parallel to the edge of the part and defines an outer cavity having generally the same shape as the part. Raised portion 110 is sufficiently displaced relative to the part edge to leave a flat border area which in FIG. 11 is furnished with slots 118 for connecting the part to other parts.

At least one of these sections can be formed without raised portions in a sheet-like geometry so that it is flexible and deformable when the vacuum source is applied. However, it is not required that one of the sheets be flexible and the method is operable when all sections are rigid. Such a flexible sheet is relatively more flexible than a ribbed section of equal thickness.

A section is fabricated so that it has differential curvature with respect to another section so that when it is placed on the other section, a gap exists between it and that section. This configuration prevents section edges from curling when vacuum is applied. It is understood that a flexible sheet is somewhat "floppy" in nature and is likely to sag and contact the rigid section in places other than at the edges. Since the section is flexible, it conforms to the rigid section curvature under vacuum so that their surfaces are in intimate contact as the part cures. Sections can also be formed with flanged edges to prevent the sections from sliding with respect to one another when the parts are in contact. Flanges can also help prevent section edges from curling up when vacuum is applied.

A section can have more than one raised portion so that multiple, interconnected and contiguous channels, defining a single hollow cavity, are produced Alternatively, the raised portion can be configured so that channels are not interconnected and not contiguous, thus defining multiple, separate hollow cavities. Sections can be designed with an approximately uniform distribution of hollow interior channels so that atmospheric pressure can provide a fairly uniform compressive force to hold the sections together as the fiberglass cures.

A single orifice can be used to connect the vacuum source to a single hollow interior cavity while multiple orifices are needed to connect the vacuum source to multiple, separate hollow cavities. These orifices can be located in the flexible section opposite the raised portions of the rigid section. After the fiberglass has cured and the vacuum source, which can be an ordinary shop vacuum, has been removed, the orifice can be sealed with a plug which can have a hollow interior.

According to another aspect of the invention, a fiberglass part having a smooth finish on all sides has a raised portion on a side adjacent to a hollow interior channel. An orifice for connecting the hollow interior channel to a vacuum source is provided. The smooth surface finish can be a gel coat.

The article can have a raised portion with an adjacent hollow interior channel extending substantially around its entire periphery following the part shape but leaving a flat border which can optionally be formed into flanges or be connected to other parts. Raised portions can have adjacent, interconnected and contiguous hollow interior channels which define a single hollow interior cavity. Alternatively, raised portions can have adjacent, hollow interior channels which are not interconnected and not contiguous, thus defining multiple, separate hollow interior cavities. A single orifice can be used to evacuate the single interior cavity, while multiple orifices are needed to evacuate the multiple hollow interior cavities. An orifice can be located on a fiberglass section having no raised portions and can be sealed with a plug which can be hollow. The fiberglass part can have flanged edges and be equipped with means for connecting a part to other parts for constructing larger articles.

BRIEF DESCRIPTION OF THE DRAWINGS

FIG. 1 is a plan view of a fiberglass section having a raised portion.

FIG. 2 is a plan view of a fiberglass section having two non-contiguous raised portions.

FIG. 3 is a plan view of a flat fiberglass section.

DETAILED DESCRIPTION OF THE PREFERRED EMBODIMENT

Figure 4:
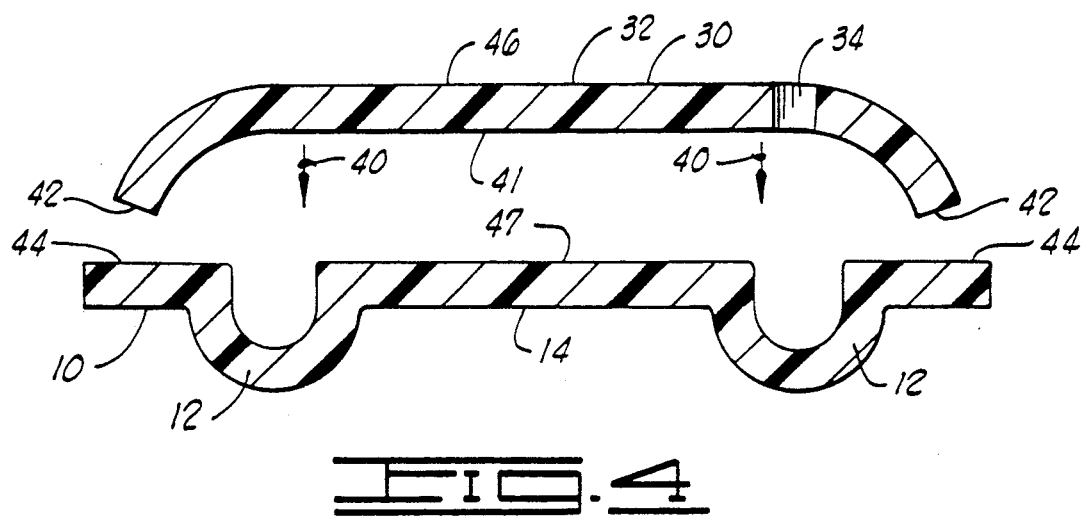
FIG. 4 is a cross section view schematically showing how a smooth fiberglass section such as that of FIG. 3 is brought into contact with a fiberglass section having a raised portion such as that shown in FIG. 1.

In a preferred embodiment, a fiberglass article having a smooth surface on all exterior sides is produced from at least two fiberglass sections each of which has a smooth and an unfinished surface. The fiberglass sections, such as sections 10, 20 and 30 shown in FIGS. 1-3, can be produced using conventional lay-up molding techniques wherein a gel coat is applied to the inside of a form to produce a smooth outer surface upon which alternating layers of fiberglass matting and resin are "laid up" on the form to construct the section.

Using this technique, sections of varied geometry, including flat planar sheets, curved planar sheets, and flat and curved ribbed sections can be fabricated in a wide range of sizes.

FIG. 1 is a plan view of fiberglass section 10. Raised portion 12 is provided in smooth surface 14 of section 10 for rigidity and to define hollow interior channels.

FIG. 2 is a plan view of fiberglass section 20 where raised portions 22 and 24 in smooth surface 26 are not interconnected.

FIG. 3 is a plan view of flexible fiberglass section 30 showing smooth surface 32 which has no raised portions. Section 30 is also furnished with orifice 34 for connection to a vacuum source.

FIG. 4 schematically depicts the step of contacting rigid section 10 with flexible section 30, as section 30 is placed on section 10 as indicated by arrows 40. At least one rough surface 41 or 47 of sections 10 and 30 is wet with a bonding agent such as a resin. The cross section view shows that flexible section 30 is slightly curved at the edges 42 with respect to rigid section 10. Hence, when section 30 is in contact with section 10 its edges 42 will touch section 10 near edges 44 while its center portion 46 arches above rough surface 47 of section 10.

While, in this preferred embodiment, a fiberglass part is fabricated from a flexible and a rigid section, the invention can be practiced using two ribbed rigid sections as long as a hollow interior cavity, capable of being evacuated exists between the sections. Furthermore, the flexible section may sag in spots where it will touch the rigid section. It is not necessary that a uniform or arched gap exist everywhere between the sections as long as some degree of differential curvature prevails between their edges.

Figure 5:
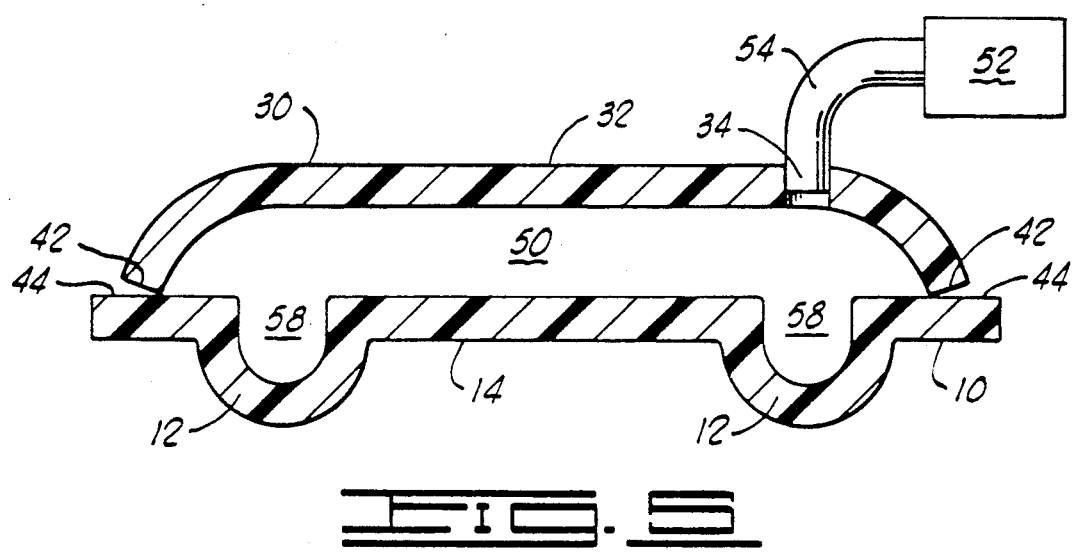
FIG. 5 is a cross section view schematically showing a vacuum source connected to the parts of FIG. 4.

FIG. 5 shows flexible section 30 resting on rigid section 10 with air space 50 between the two sections. In this step of the method, vacuum source 52, which can be a low power vacuum such as a conventional shop vacuum, is connected via hose 54 to orifice 34 in flexible section 30. Orifice 34 is located opposite raised portion 12 of rigid section 10. Since raised portions 12 of section 10 are contiguous and interconnected as shown in the plan view of FIG. 1, a single orifice is sufficient to evacuate hollow interior channels 58 which are adjacent to raised portions 12. The shape and size of orifice 34 can be adjusted to accommodate the size and configuration of vacuum hose 54. Typical orifice dimensions are on the order of 1" to 1¼" in diameter. If rigid section 10 has non-communicating raised portions like 22 and 24 shown on section 20 in FIG. 2, multiple orifices, one for each non-communicating raised portion, can be provided.

Figure 6:
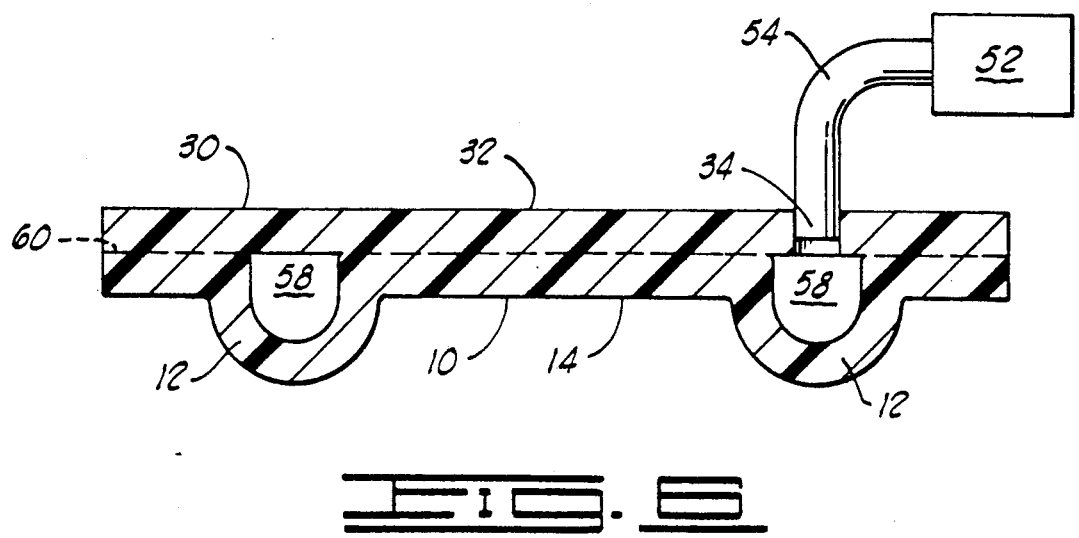
FIG. 6 is a cross section view schematically showing how the parts of FIG. 5 are brought into intimate planar contact upon application of a vacuum.

FIG. 6 shows rigid section 10 and flexible section 30 which have been brought into intimate contact after vacuum source 52 has been applied for a short period of time, approximately 20-30 seconds. Dotted line 60 indicates where sections 30 and 10 are joined. Flexible section 30 is no longer curved with respect to rigid section 10. Compressive forces exerted by atmospheric pressure deform flexible section 30, removing its curvature with respect to section 10 and making it conform to rigid section 10.

Figures 7, 8:
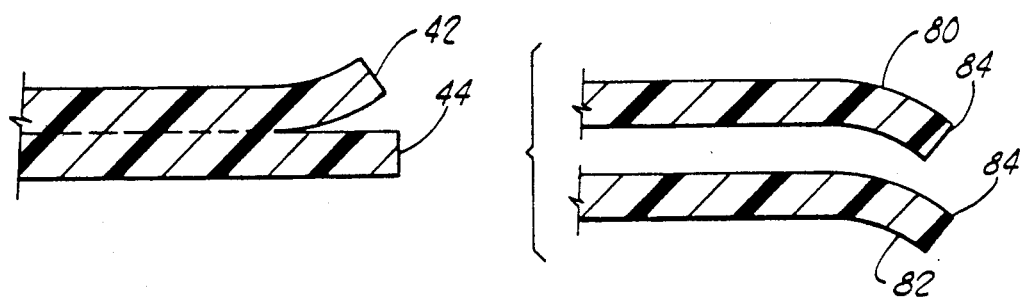
FIG. 7 is a schematic detail cross section view showing how edges of sections shown in FIG. 5 can pull apart and curl up during part fabrication.
FIG. 8 is a schematic detail cross section view showing flanged edges which can be formed on the edges of sections shown in FIG. 5.

Flexible section 30 is curved with respect to rigid section 10 to prevent section edges 42 and 44 from curling up and pulling away from each other when vacuum source 52 is connected to sections 10 and 30. This problem is depicted schematically in FIG. 7 where flexible section edge 42 is curling up away from rigid section edge 44. Edge separation can also be avoided as shown in FIG. 8 where both sections 80 and 82 are provided with flanged ends 84. Flanged ends prevent sections from becoming displaced with respect to one another when sections are brought into contact as in FIGS. 4 and 5. Flanged ends 84 keep sections from shifting and edges from curling up when vacuum is applied as in FIGS. 5 and 6. Flanged ends 84 can be particularly useful when both sections being joined are rigid.

Figure 9:
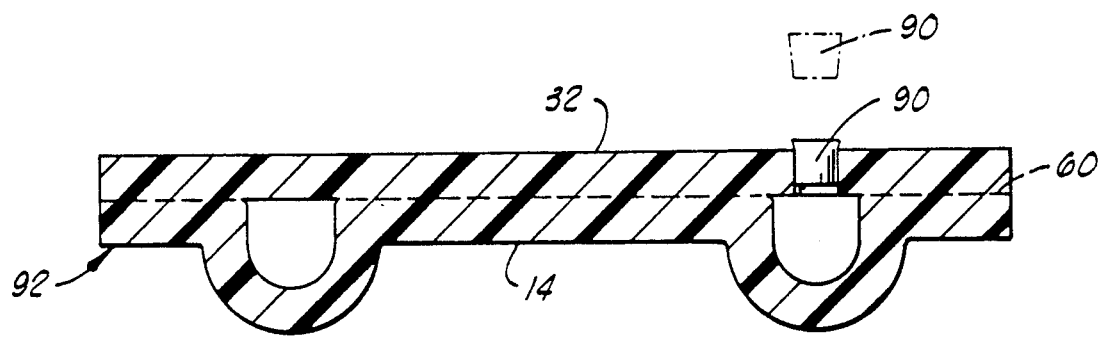
FIG. 9 is a schematic cross section view showing how the vacuum connection orifice is sealed after the sections have cured.
Figure 10:
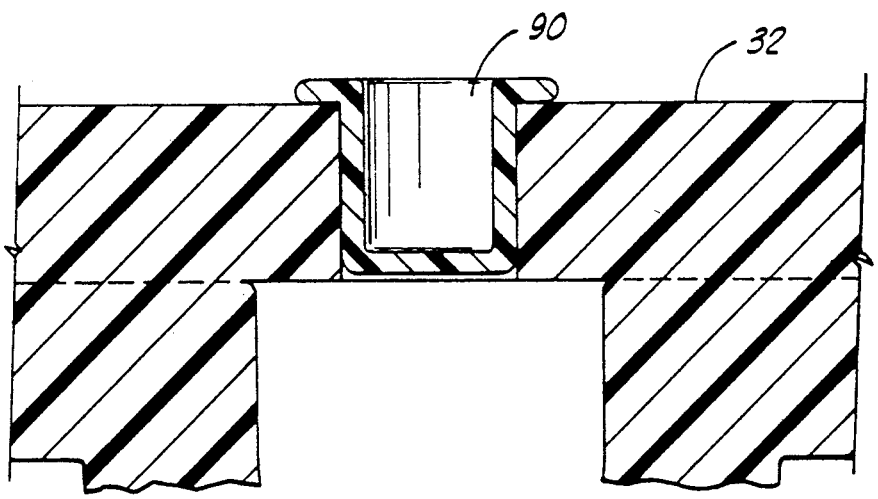
FIG. 10 is a detail cross section view showing a plug for the vacuum connection orifice.

After the fiberglass part has set up sufficiently such that removal of vacuum source 52 and hose 54 does not dislodge section 30 with respect to section 10, vacuum hose 54 can be disconnected from orifice 34 and orifice 34 sealed with plug 90 as shown in FIG. 9. Typically parts are sufficiently set up within twenty to thirty-five minutes with the exact set up time determined by factors including fiberglass lay-up gun calibration, mold temperature and shop temperature. Orifice 34 is usually sealed with plug 90 after the part has been removed from the mold and is undergoing detailing or preparation for shipment. The part is typically cured for approximately one hour after vacuum source 52 has been disconnected from the part. When curing is complete, a single integral fiberglass part 92, having smooth surfaces 14 and 32 on both sides is produced. Plug 90 can be made of rubber or any flexible material in a hollow configuration shown schematically in the detail view of FIG. 10. Plug dimensions are typically 1 to 1¼ inches in diameter.

EXAMPLE

Figure 11:
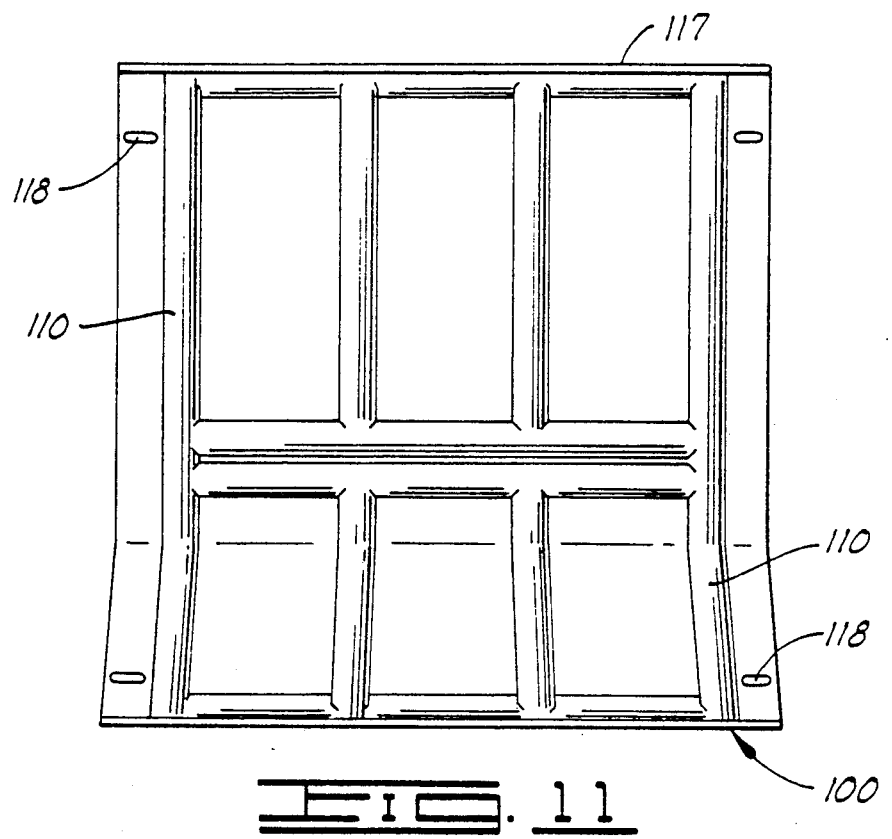
FIG. 11 is an elevation front view of a fiberglass part having raised portions uniformly distributed on its front surface.
Figure 12:
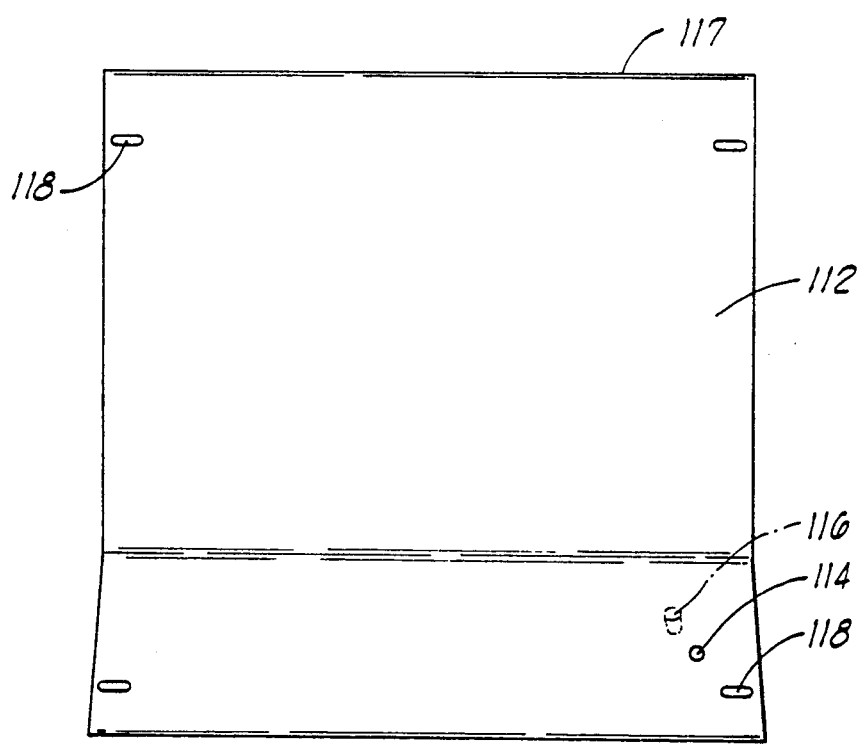
FIG. 12 is an elevation rear view of a fiberglass part.

FIGS. 11 and 12 show a fiberglass part, a cooling tower section, fabricated using the method of the invention. Part 100 with roughly 6 feet × 6 feet square and ¼ inch thick dimensions has an outer side 110 with interconnected, contiguous raised portions approximately 3 inches high and is curved as shown in FIG. 11. Inner side 112 is conformingly curved and has no raised portions as shown in FIG. 12. It includes orifice 114 provided with rubber plug 116. Inner side 112 is also roughly 6 feet × 6 feet square and ¼ inch thick.

All exterior surfaces have a smooth gel coat finish. The part has flanged ends 117. Slots 118 are bolt holes for fastening cooling tower stack parts together to form a complete cooling tower.

What is claimed is:

1. A method for forming a fiberglass part comprising the steps of:
   (a) forming first and second fiberglass sections, each of which has a smooth surface and an unfinished surface and edges so that said first section has a raised portion and said second section is relatively more flexible than said first section and has differential curvature at said edges with respect to said first section;
   (b) wetting said unfinished surface of at least one of said first and second fiberglass sections with a bonding agent;
   (c) placing said unfinished surfaces of said first and second fiberglass sections, including said at least one wet, unfinished surface together such that said edges are brought into contact, and so that a hollow interior channel is defined between said first and second fiberglass sections and adjacent said raised portion;
   (d) connecting a vacuum source to said hollow interior channel to evacuate said hollow interior channel, thereby bringing the sections into intimate contact and removing the differential curvature, and causing atmospheric pressure to compressively hold said first and second fiberglass sections firmly together; and
   (e) allowing said first and second fiberglass sections to curve, forming a single, integral fiberglass part having a smooth finish on all surfaces.

2. The method of claim 1 wherein said smooth surface of step (a) is produced by spraying a gel coat into fiberglass section forms before fiberglass and resin layers are laid therein.

3. The method of claim 1 wherein said first section is formed so that said raised portion makes said first section rigid.

4. The method of claim 3 wherein said first rigid section has said raised portion extending substantially around its entire periphery following the shape of said first section.

5. The method of claim 1 wherein said second section is formed in step (a) so that it lacks said raised portion, and has a sheet-like geometry.

6. The method of claim 1 wherein said bonding agent used for wetting in step (b) is a resin.

7. The method of claim 1 wherein more than one raised portion is formed in step (a) so that said hollow interior channels adjacent the raised portions are interconnected and contiguous when the first and second sections are placed together in step (c) such that said hollow interior channels define a single hollow cavity to be evacuated in step (d).

8. The method of claim 1 wherein more than one raised portion is formed in step (a) so that said hollow interior channels adjacent the raised portions are not interconnected and not contiguous when the first and second sections are placed together in step (c) such that said hollow interior channels define multiple, separate hollow cavities to be evacuated in step (d).

9. The method of claim 7 wherein said hollow interior channels are distributed approximately uniformly in said part so that atmospheric pressure uniformly compressively holds the sections together in step (d).

10. The method of claim 8 wherein said hollow interior channels are distributed approximately uniformly in said part so that atmospheric pressure uniformly compressively holds the sections together in step (d).

11. The method of claim 7 wherein a single orifice is provided to connect said vacuum source to evacuate said single hollow cavity according to step (d).

12. The method of claim 8 wherein multiple orifices are provided to connect said vacuum source to evacuate said multiple, separate hollow cavities according to step (d).

13. The method of claim 11 wherein said orifice is located on said second section and said orifice is opposite said raised portion of said first section.

14. The method of claim 12 wherein said orifices are located on said second section and said orifices are opposite said raised portions of said first section.

15. The method of claim 11 wherein said orifice is sealed with a plug after step (d).

16. The method of claim 12 wherein said orifices are sealed with plugs after step (d).

17. The method of claim 5 wherein due to said differential curvature at the edges a gap exists between the sections when they are placed together according to step (c).

18. The method of claim 17 wherein said sections are slightly non-conforming when said vacuum source is connected according to step (d).

19. The method of claim 1 wherein said sections have their surfaces substantially in intimate contact during curing in step (e).

20. The method of claim 1 wherein said edges are flanged edges to prevent said sections from sliding with respect to one another when said sections are placed together according to step (c) and to prevent said edges from curling up when said vacuum source is connected in step (d).

21. The method of claim 1 wherein said vacuum source is a conventional shop vacuum.

22. The method of claim 1 wherein said vacuum source remains connected until the fiberglass has cured sufficiently in step (e) so that removal of said vacuum source does not cause said sections to be displaced with respect to one another.

23. The method of claim 1 wherein said single integral fiberglass part resulting from step (e) further includes means for connecting to other parts to allow for construction of a single article.

24. The method of claim 1 wherein in step (c) said unfinished surface of said second section rests on said unfinished surface of said first section to create a seal adequate to allow evacuation of said hollow interior channel in step (d).

* * * * *